United States Patent [19]
Hurd

[11] 3,975,057
[45] Aug. 17, 1976

[54] STOPPING DEVICE FOR AIR CONVEYOR
[75] Inventor: Stanley E. Hurd, Sunnyvale, Calif.
[73] Assignee: The Motch & Merryweather Machinery Company, Hayward, Calif.
[22] Filed: Feb. 6, 1975
[21] Appl. No.: 547,667

[52] U.S. Cl.................................. 302/31; 193/40; 214/1 BE; 226/195; 271/183; 271/195
[51] Int. Cl.².................... B65G 51/02; B65G 53/58
[58] Field of Search........................ 302/2 R, 29, 31; 214/1 BE; 271/183, 195, 231; 226/95, 97, 195; 193/32, 40

[56] References Cited
UNITED STATES PATENTS

| | | | |
|---|---|---|---|
| 2,538,972 | 1/1951 | Magnani | 214/1 BE |
| 3,180,688 | 4/1965 | Futer | 302/29 |
| 3,190,460 | 6/1965 | Rubin | 302/29 |
| 3,603,646 | 9/1971 | Leoff | 302/29 |
| 3,717,381 | 2/1973 | Hagler | 302/31 |

*Primary Examiner*—Evon C. Blunk
*Assistant Examiner*—Jeffrey V. Nase
*Attorney, Agent, or Firm*—Patrick J. Walsh

[57] ABSTRACT

Disclosed is an air conveyor comprised of a deck having multiple openings and an underlying plenum containing air under pressure. The air from the plenum issues through the openings as jets to lift articles and advance them along a predetermined path spaced above the deck. To stop the articles, a second plenum is disposed within the first mentioned plenum and in communication with the openings through the conveyor deck at a location at which the article is to be stopped. A normally open valve provides communication between the first and second plenums whereby air under pressure in the first plenum passes into the second plenum and out through the openings in the conveyor deck for lifting and advancing the articles on the conveyor similarly as accomplished by the air issuing through the other openings in direct communication with the first plenum. A normally closed second valve commmunicates between a vacuum pressure source and the second plenum. Upon closing the first valve and opening the second valve, a vacuum pressure is applied across the opening in the deck overlying the second plenum whereby the articles are slowed, drawn down against the conveyor deck, and stopped.

2 Claims, 4 Drawing Figures

STOPPING DEVICE FOR AIR CONVEYOR

The present invention relates to an air conveyor of the type useful for conveying articles along a predetermined path out of contact with any conveying apparatus and particularly relates to a device for stopping the articles at a predetermined location along their path of movement.

Air conveyors for moving articles along a predetermined path without physical contact between the articles and the conveyor have been proposed and constructed in the past. Such conveyors usually comprise a conveyor deck overlying a plenum containing air under pressure. The deck usually includes a plurality of openings configured such that air issuing through the openings from the plenum form air jets having vertical and horizontal flow components for respectively elevating the article above and advancing them along the conveyor deck. In many application, it is desirable that the articles being conveyed stop at a predetermined location along their path of movement. Mechanical or impact type stops have been proposed and constructed in the past for this purpose. However, with mechanical stops, there is the danger of damaging the article and/or its container or carton upon its physical impact against the stop. Moreover, it is necessary to remove a mechanical type stop from the path of movement of the article in order to again advance the article along the conveyor from its stopped position. This, of course, requires mechanical linkages or the like to remove the stop from the path of movement of the article and to relocate it in the path of movement for stopping the next article. Also, it requires location of apparatus above the conveyor deck which, in certain applications, is objectionable. Further, mechanical stops do not often permit gradual deceleration of the articles or adjustment in their rate of deceleration.

The present invention provides a stopping device for air conveyed articles which eliminates and/or minimizes the foregoing and other disadvantages associated with prior systems for stopping air conveyed articles and provides a novel and improved vacuum-type stop for an air conveyor having various advantages in construction, mode of operation and result as compared with such prior conveyor stopping systems. Particularly, the present invention includes a conventional air conveyor comprised of a conveyor deck overlying a plenum containing air under pressure. The deck has a plurality of openings for transmitting air under pressure from the plenum in the form of air jets for impingement against the articles to be conveyed. The air jets have both vertical and horizontal flow components such that the articles are respectively elevated above the surface of the conveyor deck and propelled horizontally along a predetermined path of movement defined by the conveyor deck. To the foregoing described conventional air conveyor, there is provided in accordance with the present invention a second plenum within the first mentioned plenum. The second plenum is located along the underside of the deck at the desired stopping place for the article. The second plenum lies in open communication with the openings through the deck at such stopping location. A first normally open valve provides for open communication between the first and second plenums whereby, in normal operation of the air conveyor, air under pressure in the first plenum also enters the second plenum and issues through the openings in the deck overlying the second plenum similarly as the air in the first plenum issues through the openings directly overlying the first plenum. In this manner, articles are continuously conveyed along the conveyor deck irrespective of the location of the articles over either the first or second plenum. Thus, conveyance past a stopping location is achieved in like manner as the articles are normally conveyed.

A second normally closed valve communicates on one side with a vacuum pressure source and on its other side with the second plenum. To stop the articles being conveyed at the predetermined location, the normally open first valve is closed to preclude further communication of air under pressure from the first plenum to the second plenum. The normally closed second valve is then opened to provide communication between the vacuum pressure source and the second plenum. Accordingly, while the openings in the deck adjacent the openings overlying the second plenum continue to direct air against the articles for elevating and conveying the same along the deck, the vacuum pressure source suctions air from above the conveyor deck downwardly through the openings into the second plenum. When the article overlies the second plenum and its associated openings, the suction created decelerates the article and draws it down onto the deck hence preventing further conveyance of the article along the deck.

It is an important feature hereof that the area of the deck surrounding the openings in communication with the second plenum is smaller than the plan area of the article to be stopped. The article thus completely overlies and covers the openings in communication with the second plenum. When it is desired to again convey the stopped article, the valves are returned to their normal conditions. Air under pressure from the first plenum then again enters the second plenum for issuance through the openings associated therewith. The article overlying such openings is thus elevated from the deck and propelled along the predetermined path of movement.

For more gradually stopping the article, an additional one or more plenums similar to the second plenum may be spaced along the underside of the conveyor deck with varying degrees of vacuum pressure applied. In this manner, the article is first gently slowed as it passes over the one or more additional second plenums and then stopped at the desired location.

Accordingly, it is the primary object of the present invention to provide a novel and improved stopping device for air conveyed articles.

It is another object of the present invention to provide a novel and improved stopping device for an air conveyor system which functions to stop the articles conveyed without physically contacting therewith.

It is still another object of the present invention to provide a novel and improved air conveyor system having a vacuum stop.

It is a further object of the present invention to provide a novel and improved air conveyor system having a vacuum stop wherein no moving parts or other apparatus above the conveyor surface are required to effect the stop.

It is a still further object of the present invention to provide a novel improved air conveyor system wherein the articles conveyed can be gradually stopped.

These and further objects and advantages of the present invention will become more apparent upon reference to the following specification, appended claims and drawings wherein:

Figure 1:
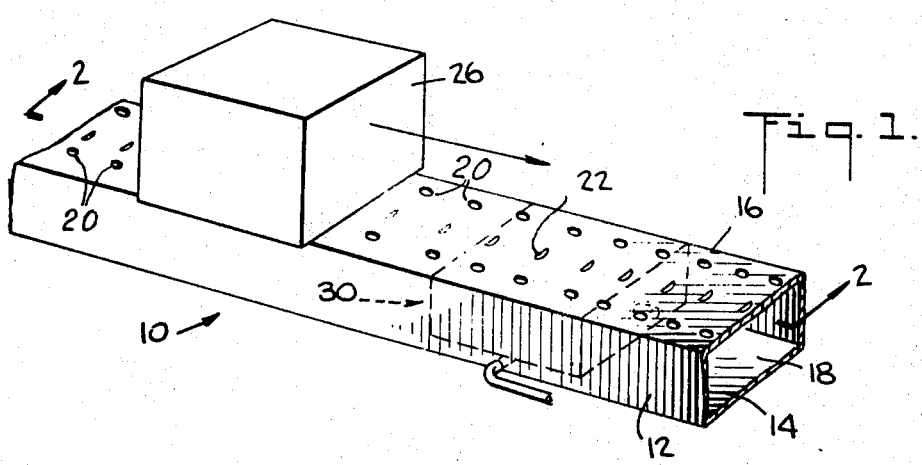
FIG. 1 is a fragmentary perspective view of an air conveyor incorporating the stopping device therefor constructed in accordance with the present invention.

Referring now to the drawings, particularly to FIG. 1, there is illustrated an air conveyor, generally indicated 10, having elongated side and bottom walls 12 and 14, respectively and an elongated conveyor deck 16, the walls and deck defining an elongated plenum 18 of generally rectangular cross section. An air blower or other suitable source of air under pressure, not shown, supplies plenum 18 with air under pressure. The air under pressure in plenum 18 is adapted to communicate upwardly through a plurality of openings in conveyor deck 16. Particularly, the openings may comprise a combination of lift holes 20 and directional slots 22. The lift holes 20 may constitute circular openings through the deck and are thereby configured to issue air from plenum 18 in the form of substantially vertically directed air jets. These air jets thus impinge against and elevate an article, for example, the carton 26 illustrated in FIG. 1 above deck 16. Slots 22 are configured to issue air from plenum 18 and above deck 16 in the form of air jets having predominantly horizontal flow components for the purpose of propelling the elevated article along a path defined by but spaced above the conveyor deck. It will be appreciated that the slots 22 may be formed by incising the deck and striking or bending down a portion of the deck on the downstream side of the incision to form a baffle 23 projecting within plenum 18. Thus, the air jet issuing through the slots 22 obtain both vertical and horizontal flow components with the horizontal components being predominant. It will be appreciated, however, that the conveyor deck 16 may be comprised of solely slots 22 without lift holes 20. The directional slots and lift holes, if provided, may be arranged in conveyor deck 16 in any suitable manner, for example as illustrated in U.S. Pat. No. 3,180,688.

Figure 2:
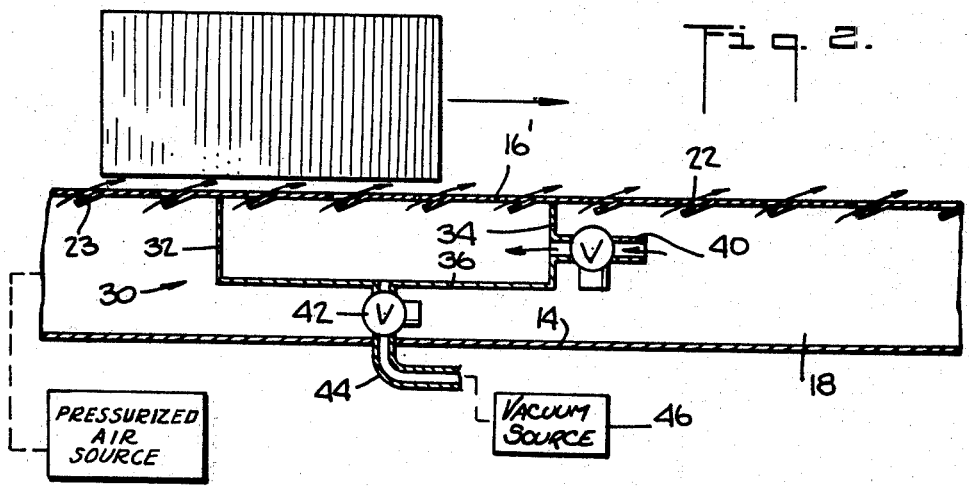
FIG. 2 is an enlarged fragmentary cross-sectional view thereof taken about on line 2—2 of FIG. 1 and illustrating an article as it is moved along by the conveyor.

It will thus be appreciated that the air jets issuing through the openings function to maintain the articles elevated above deck 16 and to convey the articles along a predetermined path above and defined by the conveyor deck 16. In order to stop an article at a predetermined location along conveyor 10, a second plenum generally indicated 30 in FIG. 2, is provided at that location. The plenum 30 comprises end walls 32 and 34, a bottom wall 36 elevated above the bottom wall 14 of plenum 18 and the portion 16' of deck 16 in vertical registry with bottom wall 36. The side walls 12 of plenum 18 may also form the side walls of plenum 30. Alternatively, plenum 30 may be provided with discrete side walls located inwardly of side walls 12 of plenum 18. Likewise, the lower wall 36 of plenum 30 may comprise the portion of lower wall 14 of plenum 18 in the event that the side walls are inset from walls 12 or other means are provided for supplying air under pressure to the portions of plenum 18 on opposite sides of plenum 30.

In accordance with the present invention, there is provided a normally open valve 38 in a conduit 40 in communication at one end with plenum 30 through end wall 34 thereof and at its opposite end with plenum 18. Thus, air under pressure in plenum 18 is normally provided plenum 30 through conduit 40. There is also provided a normally closed valve 42 in conduit 44 the latter communicating with plenum 30 through bottom wall 36 and being coupled to a vacuum source 46.

In normal conveyor operations, air under pressure supplied plenum 18 also enters plenum 30 via conduit 40 past the normally open valve 38. Consequently, air under pressure is supplied to the openings in conveyor deck 16 which directly overlie the portions of plenum 18 on opposite sides of plenum 30 and the openings in conveyor deck 16' which overlies plenum 30. In this manner, the air issuing through these openings serves as previously described to elevate and propel the article along the conveyor deck and past the stopping location defined by conveyor deck 16'.

Figure 3:
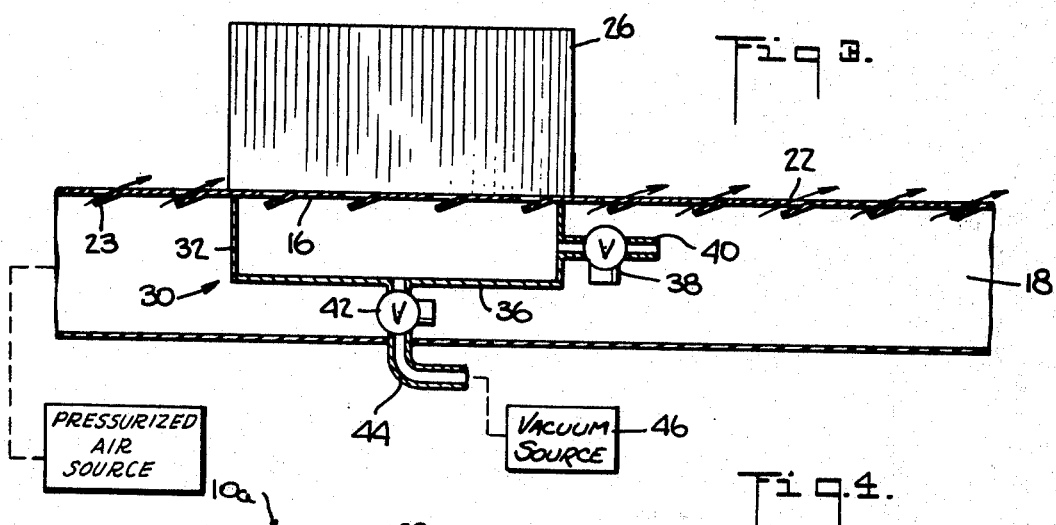
FIG. 3 is a view similar to FIG. 2 and illustrating the article in a stopped position along the conveyor.

In order to stop an article 26 at this stopping location, the normally open valve 38 is closed thereby precluding communication of air under pressure from plenum 18 into plenum 30 and hence through the openings in deck 16' overlying plenum 30. Normally closed valve 42 is then opened whereby plenum 30 and the openings through deck 16' lie in communication with the vacuum pressure source 46 via conduit 44. It will be appreciated that under this condition, the air under pressure in plenum 18 flows outwardly through the openings in deck 16 on both the upstream and downstream sides of plenum 30 whereby articles upstream and/or downstream of plenum 30 are continuously conveyed along conveyor 10 in the manner previously described. However, when an article 26 overlies deck 16' and plenum 30, the vacuum pressure source causes a suction which draws air from above deck 16' through its openings and into plenum 30. This suction draws the article downwardly toward the deck until it engages deck 16' and overlies plenum 30 as illustrated in FIG. 3. Thus, the article 26 is stopped without physical impact against any mechanical type stopping device. It will be noted that the article first slows as its leading edge enters the suction zone above deck 16'. The article is brought to a complete stop upon its vertical registration over all of the openings in deck 16'.

In order to again convey article 26 along the conveyor after it has been stopped, the valves are returned to their normal conditions, that is, valve 38 is opened and valve 42 is closed. Consequently, air under pressure from plenum 18 enters plenum 30 via conduit 40 and issues through the openings in deck 16' to elevate and propel article 26 along the conveyor.

It will be appreciated that any type of valve and control therefor can be provided. For example, solenoid-actuated valves may be provided.

Figure 4:
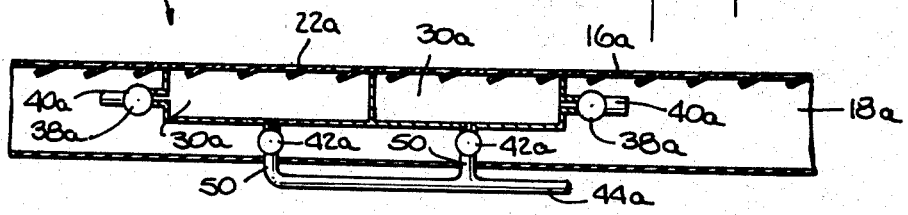
FIG. 4 is a fragmentary cross-sectional view on a reduced scale of a further embodiment of the air conveyor hereof.

Referring now to the embodiment hereof illustrated in FIG. 4, there is provided a conveyor 10a including a plenum 18a similar in all respects to the plenum 18 described with respect to the previous embodiment and having a deck 16a with lifting and propelling openings therein. However, in this form a pair of plenums 30a and 30a' are provided similarly as plenum 30. Plenum 30a is upstream of plenum 30a' and each lie in communication with the air under pressure in plenum 18 via valves 38a in conduits 40a. Also, plenums 30a and 30a' lie in communication with a vacuum source via valves 42a in branch conduits 50 of a main conduit 44a.

In this form, the articles on conveyor 10a are more gradually slowed to a stop. That is, the vacuum pressure source applied to the upstream plenum 30a gradually slows the article until it is finally stopped when it obtains a position overlying the downstream plenum 30a. Also, to control the rate of deceleration, different vacuum pressures may be applied to the upstream and downstream plenums 30a and 30a' respectively through regulators, not shown.

It will be appreciated that the objects of the present invention are fully accomplished in that the foregoing described apparatus provides a stopping device for air-conveyed articles which utilizes no moving parts and minimizes and/or eliminates damage to the articles or containers. Moreover, the stopping device is readily and easily constructed and adapted to existing air conveyors.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An article conveying apparatus comprising:
   a conveyor deck defining a conveyor path and having a plurality of openings therein, said openings being arranged along said deck and being configured to issue air jets having horizontal flow components along said conveyor deck for conveying the articles along said path,
   a first plenum chamber underlying said conveyor deck for supplying air under pressure through said openings to establish said air jets,
   means for supplying pressurized air to said first plenum chamber,
   stopping means comprising a second plenum chamber located within said first plenum chamber at a selected location underlying a selected number of said openings,
   means defining a passage between said first and second plenums, a valve in said passage for selectively communicating air under pressure from said first plenum into said second plenum and preventing communication between said first and second plenums,
   a vacuum pressure source,
   means defining a passage between said second plenum and said vacuum pressure source, and a valve in said passage for selectively applying a vacuum in said second plenum and preventing communication between said second plenum and said vacuum source,
   whereby said selected openings function to convey articles when said first and second plenums communicate with each other and as a stopping zone when said second plenum communicates with said vacuum source.

2. Apparatus according to claim 1 wherein said stopping means includes a third plenum underlying said deck adjacent said selected location and upstream of said second plenum, means for supplying air under pressure to said third plenum for issuance through a predetermined number of openings in said deck to convey the articles along the portion of said path overlying said third plenum, and means for selectively communicating air under pressure and applying a vacuum pressure to said third plenum, said third plenum being adapted to initially slow the articles conveyed for stopping at said predetermined location when the vacuum pressure is applied to said second and third plenums.

* * * * *